United States Patent
Passerini et al.

(10) Patent No.: US 10,403,885 B2
(45) Date of Patent: Sep. 3, 2019

(54) ACTIVE MATERIAL FOR BATTERIES

(71) Applicant: Albemarle Germany GmbH, Frankfurt am Main (DE)

(72) Inventors: Stefano Passerini, Ulm (DE); Sangsik Jeong, Ulm (DE); Dominic Bresser, Münster (DE); Martin Winter, Münster (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 182 days.

(21) Appl. No.: 14/350,496

(22) PCT Filed: Oct. 10, 2012

(86) PCT No.: PCT/EP2012/070049
§ 371 (c)(1),
(2) Date: Apr. 8, 2014

(87) PCT Pub. No.: WO2013/057023
PCT Pub. Date: Apr. 25, 2013

(65) Prior Publication Data
US 2014/0255787 A1    Sep. 11, 2014

(30) Foreign Application Priority Data

Oct. 17, 2011   (DE) .................. 10 2011 084 646

(51) Int. Cl.
*H01M 4/36*   (2006.01)
*H01M 4/1393*   (2010.01)
(Continued)

(52) U.S. Cl.
CPC ........... *H01M 4/1393* (2013.01); *C01B 17/22* (2013.01); *H01M 4/0402* (2013.01);
(Continued)

(58) Field of Classification Search
CPC .. H01M 4/1393; H01M 4/0402; H01M 4/136; H01M 4/1397; H01M 4/366;
(Continued)

(56) References Cited

U.S. PATENT DOCUMENTS 6,228,803 B1   5/2001 Gadkaree et al.
6,248,691 B1   6/2001 Gadkaree et al.
(Continued)

FOREIGN PATENT DOCUMENTS

CN   1396202 A   2/2003
CN   1794495 A   6/2006
(Continued)

OTHER PUBLICATIONS

Choi, et al. "Improvement of cycle property of sulfur electrode for lithium/sulfur battery", J. of Alloys and Compounds, 449 (2008), pp. 313-316.
(Continued)

*Primary Examiner* — Ula C Ruddock
*Assistant Examiner* — Matthew W Van Oudenaren
(74) *Attorney, Agent, or Firm* — Marcy M. Hoefling; Troy Kleckley; Nathan C. Dunn

(57) ABSTRACT

A method of producing an active material for batteries comprising providing electrochemically active particles, optionally comminuting the electrochemically active particles, adding an organic carbon compound, optionally in a suitable organic solvent, and mixing, heating the mixture under protective gas to a temperature above the decomposition limit of the organic compound and below the decomposition temperature of the electrochemically active particles, active materials thus obtained and also corresponding applications and uses.

22 Claims, 4 Drawing Sheets

Figure 1:
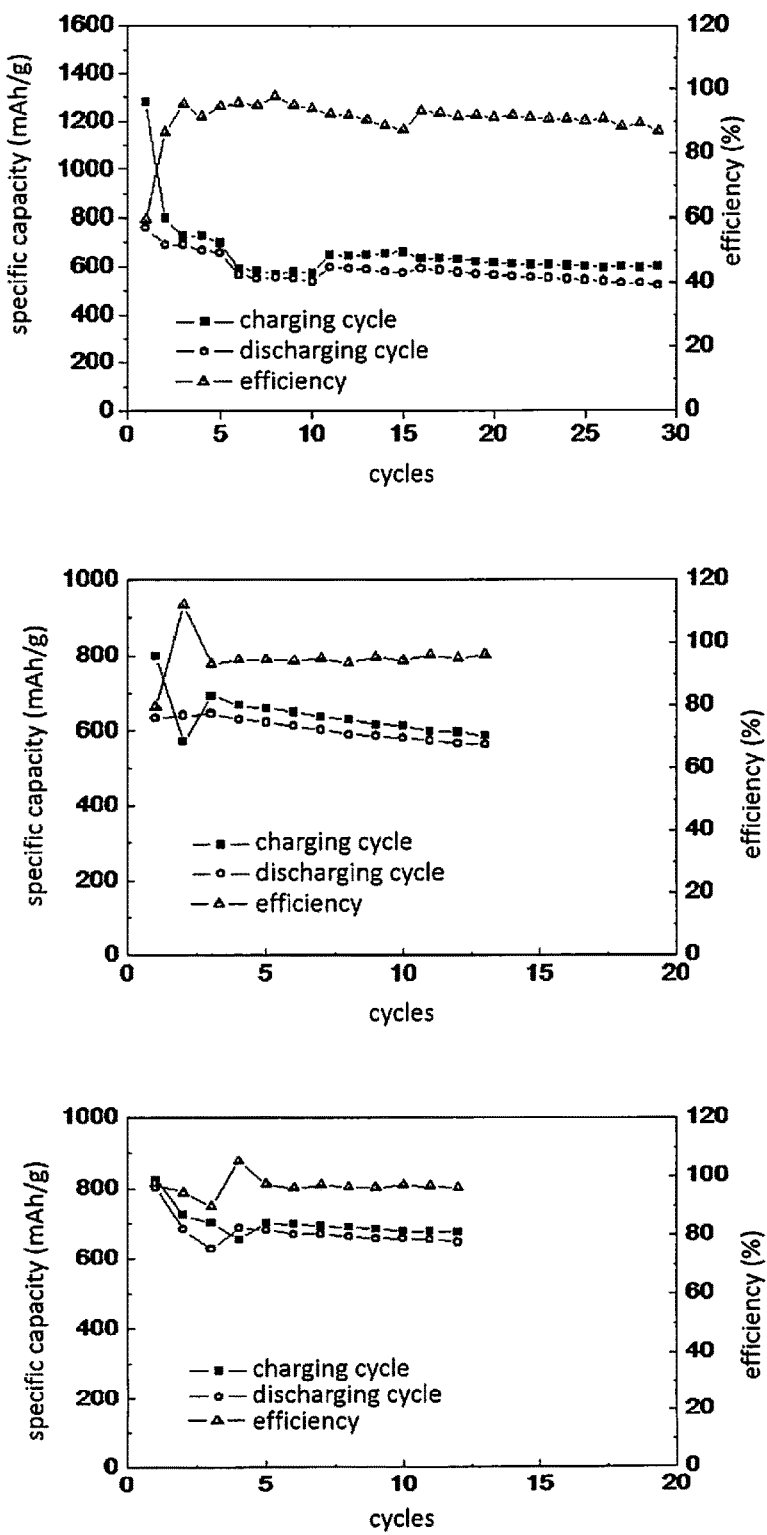

(51) Int. Cl.

| | |
|---|---|
| H01M 4/04 | (2006.01) |
| C01B 17/22 | (2006.01) |
| H01M 4/136 | (2010.01) |
| H01M 4/1397 | (2010.01) |
| H01M 4/58 | (2010.01) |
| H01M 10/052 | (2010.01) |

(52) U.S. Cl.
CPC ......... *H01M 4/0471* (2013.01); *H01M 4/136* (2013.01); *H01M 4/1397* (2013.01); *H01M 4/366* (2013.01); *H01M 4/5815* (2013.01); *H01M 10/052* (2013.01); *C01P 2002/72* (2013.01); *C01P 2004/61* (2013.01); *C01P 2004/62* (2013.01); *C01P 2004/86* (2013.01); *C01P 2006/40* (2013.01); *H01M 4/58* (2013.01); *H01M 2220/20* (2013.01)

(58) Field of Classification Search
CPC .... H01M 4/5815; H01M 4/0471; H01M 4/58; H01M 10/052; H01M 2220/20; C01P 2004/86; C01P 2006/40
See application file for complete search history.

(56) References Cited

U.S. PATENT DOCUMENTS

| | | | |
|---|---|---|---|
| 7,541,312 | B2 | 6/2009 | Dietz et al. |
| 7,674,557 | B2 | 3/2010 | Sun et al. |
| 7,776,779 | B2 | 8/2010 | Joo et al. |
| 8,057,774 | B2 | 11/2011 | Kim et al. |
| 2007/0116625 | A1 | 5/2007 | Joo et al. |
| 2009/0304570 | A1* | 12/2009 | Kim ............... B01J 21/18 423/445 R |
| 2010/0086855 | A1 | 4/2010 | Kohmoto et al. |
| 2011/0163272 | A1* | 7/2011 | Ono ............... H01M 4/0416 252/500 |
| 2011/0200883 | A1* | 8/2011 | Cui ............... H01M 4/049 429/231.4 |
| 2012/0189914 | A1 | 7/2012 | Hara et al. |
| 2013/0209891 | A1 | 8/2013 | Neumann et al. |

FOREIGN PATENT DOCUMENTS

| | | |
|---|---|---|
| CN | 101577323 A | 11/2009 |
| CN | 102208645 A | 10/2011 |
| CN | 10-1891930 B | 1/2012 |
| JP | 2003-327473 A | 11/2003 |
| JP | 2009-211818 A | 9/2009 |
| JP | 2009-245762 A | 10/2009 |
| JP | 2010-092599 A | 4/2010 |
| JP | 47-92618 B | 10/2011 |
| JP | 47-92618 B2 | 10/2011 |
| JP | 2011-204564 A | 10/2011 |
| WO | 99/39818 A1 | 8/1999 |
| WO | 2005/089145 A1 | 9/2005 |
| WO | 2008/069633 A1 | 6/2008 |
| WO | 2011/039890 A1 | 4/2011 |
| WO | 2011/056847 A2 | 5/2011 |
| WO | 2012/055731 A1 | 5/2012 |

OTHER PUBLICATIONS

Chang, et al. "Binary electrode based on tetra(ethylene glycol) dimethyl ether and 1,3-dioxolane for lithium-sulfur battery", J. of Power Sources, 112 (2002), pp. 452-460.

Choi, et al. "Effects on the Carbon Matrix as Conductor in Sulfur Electrode for Lithium/Sulfur Battery", Materials Science Forum vols. 510-511 (2006), pp. 1082-1085; online at http://www.scientific.net.

Choi, et al. "Effects of carbon coating on the electrochemical properties of sulfur cathode for lithium/sulfur cell", J. of Power Sources, 184 (2008), pp. 548-552.

Hassoun, et al. "A High-Performance Polymer Tin Sulfur Lithium Ion Battery", Angew. Chem. Int. Ed., 49 (2010), pp. 2371-2374.

Hassoun, et al. "Rechargeable lithium sulfide electrode for a polymer tin/sulfur lithium-ion battery", J. of Power Sources, 196 (2011), pp. 343-348.

He, et al. "Expansion and shrinkage of the sulfur composite electrode in rechargeable lithium batteries", J. of Power Sources, 190 (2009), pp. 154-156.

Jeon, et al. "Preparation and electrical properties of lithium-sulfur-composite polymer batteries", J. of Materials Processing Technology, 143-144 (2003), pp. 93-97.

Ji, et al. "A highly ordered nanostructured carbon-sulphur cathode for lithium-sulfur batteries", Nature Materials, vol. 8 (2009), pp. 500-506.

Ji, et al. "Advances in Li-S batteries", J. Mater. Chem., 20 (2010), pp. 9821-9826.

Jin, et al. "Electrochemical properties of lithium-sulfur batteries", J. of Power Sources, 117 (2003), pp. 148-152.

Moskon, et al. "Morthology and electrical properties of conductive carbon coatings for cathode materials", J. of Power Sources, 174 (2007), pp. 683-688.

Peled, et al. "Lithium-Sulfur Battery: Evaluation of Dioxolane-Based Electrolytes", J. Electrochem. Soc., vol. 136, No. 6 (1989), pp. 1621-1625.

Qiu, et al. "Preparation and enhanced electrochemical properties of nano-sulfur/poly(pyrrole-co-aniline) cathode material for lithium/sulfur batteries", Electrochimica Acta 55 (2010), pp. 4632-4636.

Wang, et al. "Sulfur-carbon nano-composite as cathode for rechargeable lithium battery based on gel electrolyte", Electrochemistry Communications 4 (2002), pp. 499-502.

Wang, et al. "Sulfur Composite Cathode Materials for Rechargeable Lithium Batteries", Adv. Funct. Mater. 13, No. 6 (2003), pp. 487-492.

Wang, et al. "Sulfur-mesoporous carbon composites in conjunction with a novel ionic liquid electrolyte for lithium rechargeable batteries", Carbon 46 (2008), pp. 229-235.

Wang, et al. "Preparation and performance of a core-shell carbon/sulfur material for lithium/sulfur battery", Electrochimica Acta 55 (2010), pp. 7010-7015.

Yang, et al. "New nanostructured Li2S/Silicon Rechargeable Battery with High Specific Energy", Nano Lett. 10 (2010), pp. 1486-1491.

Yuan, et al. "Improvement of cycle property of sulfur-coated multi-walled carbon nanotubes composite cathode for lithium/sulfur batteries", J. of Power Sources, 189 (2009), pp. 1141-1146.

Zhang, et al. "Preparation and electrochemical properties of sulfur-acetylene black composites and cathode materials", Electrochimica Acta 54 (2009), pp. 3708-3713.

Yu, X-G et al., "Lithium storage in conductive sulfur-containing polymers", J.Electroanalytical Chem. Interfacial Electrochem., 2004, 573, pp. 121-128.

* cited by examiner

ACTIVE MATERIAL FOR BATTERIES

This application is a § 371 of International Application No. PCT/EP2012/070049 filed Oct. 10, 2012, and claims priority from German Patent Application No. 10 2011 084 646.8 filed Oct. 17, 2011.

The present application lays claim to the priority of DE 10 2011 084 646.

The priority document is incorporated herein by reference in its entirety.

All documents cited in the present application are incorporated herein by reference in their entirety.

The present invention relates to an active material for batteries.

RELATED ART

Battery applications, for example in electric vehicles or alternatively also storage technologies for renewable energies (e.g., wind energy, solar energy, etc.), require the development of novel technologies for rechargeable batteries having distinctly higher specific energies than hitherto obtainable and/or commercially available.

The lithium-sulfur battery is a very promising technology for these applications. This is because the theoretical gravimetric capacity of elemental sulfur ($S_8$) is 1672 mAh $g^{-1}$ or, in other words, the theoretical energy density of elemental sulfur is up to 2600 Wh $kg^{-1}$ (i.e., up to five times higher than the energy density of the already widely used lithium ion technology).

The use of sulfur and of sulfur-based electrode materials additionally offers further general advantages, including a natural, inherent overcharge protection mechanism; no health concerns; environmental compatibility; rich natural deposits; and also low extraction and production costs.

However, use of sulfur as a cathode material also presents a whole series of challenges as follows:

Sulfur and sulfur-based compounds ($Li_2S$, for example) have an extremely low electronic and ionic conductivity.

Lithium polysulfides ($Li_2S_n$, where $2<n<8$), formed as intermediates during charging and discharging, are very readily soluble in the liquid organic electrolytes used. Electronically nonconducting, insoluble $Li_2S_2$ and $Li_2S$ are thereby deposited on the cathode surface and so are no longer available electrochemically; secondly, these polysulfides can also diffuse to the anode side and become deposited there as $Li_2S_2$ and $Li_2S$, which can lead to a passivation of the anode surface, or alternatively they are reduced again there and diffuse back to the cathode side. The latter scenario is known as the "shuttle mechanism", which leads to a reduction in the specific capacity and increasing self-discharge of the battery.

On the other hand, a very large contact area between the active material and the liquid electrolyte is needed because of the above-described extremely poor ionic conductivity of the active material.

Repeated charging and discharging cycles and the attendant repeated volume expansion and, respectively, decrease lead to changes in electrode morphology and thereby ultimately to an agglomeration of sulfur particles, which again brings the extremely low electronic and ionic conductivity into play as a negative factor. Merely the surface area of the particle agglomerates becomes electrochemically active in this case which does of course decrease as a result of particle agglomeration. This in turn leads to a decrease in the attainable specific capacity (Jeon et al. Journal of Materials Processing Technology 143-144 (2003) 93-97).

The upshot of all this is that the capacity which is attainable in practice is distinctly below the theoretically possible capacity and generally decreases rapidly in the course of cycling.

The result is low cycling stability and also a low efficiency for the charging and discharging processes.

A good overview and introduction into the topic is offered by Ji & Nazar Journal of Materials Chemistry 20 (2010) 9821-9826 and Ji et al. Nature Materials 8 (2009) 500-506.

The discharging process of a sulfur electrode can be very generally described by the following net reaction equation:

$$16Li + S_8 \rightarrow 8Li_2S$$

This reaction equation reveals straight away that the use of elemental sulfur as cathode material requires a different source of lithium. Metallic lithium is therefore usually used as anode even though it as ever poses the risk of dendrite formation during repeated charging and discharging cycles.

There have already been some endeavors in the prior art to substitute the end product of the discharging process, i.e., $Li_2S$, for elemental sulfur as starting material.

The challenges that have to be overcome for $Li_2S$ to be widely used as cathode material are similar to those in the case of elemental sulfur, since the electrochemical reaction is of course the same. All that is different is that the original product is used as reactant.

Corresponding prior art is found for example in Wang et al. Electrochimica Acta 55 (2010) 7010-7015; Wang et al. Carbon 46 (2008) 229-235; Wang et al. Electrochemistry Communications 4 (2002) 499-502; Hassoun & Scrosati Angewandte Chemie 49 (2010) 2371-2374; Wang et al. Adv. Funct. Mater 13, No. 6 (2003) 487-492; Choi et al. Journal of Alloys and Compounds 449 (2008) 313-316; Zhang et al. Electrochimica Acta 54 (2009) 3708-3713; Choi et al. Materials Science Forum 510-511 (2006) 1082-1085 and Ji et al. Nature Materials 8 (2009) 500-506.

The procedures rehearsed in the prior art are generally restricted to the use of elemental sulfur ($S_8$) as starting material. For instance, a technique for carbon coating of sulfur particles by sputtering has been described (Y.-J. Choi et al., Journal of Power Sources 184 (2008), 548-552). However, this technique is very elaborate, hence costly, and so—and also because of the limited quantitative capacities of this technology—not suitable for scaling up to large industrial requirements.

Many different types of thermal intercalation/absorption of sulfur in/by mesoporous compounds of carbon in a very wide variety of forms have further been described to exploit the relatively low melting temperature of sulfur (115° C.). However, they are all likewise very elaborate and normally require the use of nanoscale/nanostructured materials of carbon which in turn are comparatively costly.

Notably a subsequent lithiation with n-butyllithium, as described in Yang et al., Nano Lett. 2010, 10, 1486-1491, is associated with several additional processing steps and the deployment of a whole series of additional reagents, and so is likewise costly and unusable for large-scale industrial practice.

Similarly, a use of polymeric nanofibers as described in Qiu et al., Electrochimica Acta 55 (2010), 4632-4636 is in view of the complexity of the method not very promising for transposition to larger scales. At the same time, the use of comparatively large amounts of such a polymer, i.e., an electrochemically inactive additive, causes a distinct reduction in the gravimetric capacity that is attainable in practice and in both the gravimetric and the volumetric energy density of the overall system represented by a battery.

Furthermore, elemental sulfur is also used here because its comparatively low melting temperature again is an important prerequisite for the thermal intercalation of sulfur into the polymer matrix.

The use of multi-walled carbon nanotubes (Yuan et al., Journal of Power Sources 189 (2009), 1141-1146) or nanowires, which are already very costly, for forming an electronically conductive matrix of carbon likewise appears to make employment of these materials on a larger scale to appear not very practicable.

It should be noted in particular that many of the attempted solutions described above involve sulfur being applied to carbon. This is again only possible by virtue of the lower melting point of sulfur. In addition, this arrangement takes particular account of the volume expansion (~+22%, cf. He et al., Journal of Power Sources 190 (2009) 154-156) in connection with lithiation.

However, it must always be borne in mind here that these volume changes, as already mentioned, cause changes in the electrode morphology in the course of charging and discharging processes. The application of sulfur to carbon thus always harbors the risk of direct contact between the sulfur particles and thus of an aforementioned particle agglomeration and also of the active material becoming detached from the carbon materials and thus a loss of electronic conductivity, in particular if a very high volumetric energy density is to be achieved via a very close arrangement of the particles and the particles are therefore packed together as closely as possible.

Moreover, a very large contact area between the sulfur and the electrolyte—although desirable to ensure a very high contact area between lithium ions and sulfur—does lead, on the other hand, to a diffusion of soluble polysulfide ions, which then leads to the above-described adverse concomitant phenomena, which is one of the main challenges in the development of sulfur-based electrode materials.

Hassoun et al, Journal of Power Sources 196 (2011) 343-348 discloses $Li_2S$—C composites obtained by simple mixing. A uniform/homogeneous enveloping of the $Li_2S$ particles is not achieved.

Moskon et al., Journal of Power Sources 174 (2007) 683-688 discloses carbon-enveloped $TiO_2$ particles obtained by coating of aqueous citric acid and subsequent thermal treatment.

Problem

The problem addressed by the invention, then, was that of overcoming the known disadvantages of the prior art, in particular with a view to a later possible large scale industrial implementation of the process.

So inter alia an inexpensive, effective and reliable way was to be found to produce active materials for batteries.

The problem addressed by the invention was further that of providing correspondingly advantageous active materials for batteries, corresponding electrodes and batteries themselves.

Solution

The problem is solved by the methods according to the present invention, the use according to the present invention and the materials according to the present invention.

Terminological Definitions

In the context of the present invention, all quantitative particulars are by weight, unless otherwise stated.

Unless otherwise stated, sizes reported/specified in the nanometer range or in the micrometer range were/are/must be determined using scanning electron microscopy (SEM).

In the context of the present invention, the term "room temperature" denotes a temperature of 20° C. Temperature particulars are given in degrees Celsius (° C.), unless otherwise stated.

Unless otherwise stated, the recited reactions and/or process steps are carried out at standard pressure/atmospheric pressure, i.e., at 1013 mbar.

In the context of the present invention, the formulation "and/or" includes not only any one particular combination but also all combinations of the elements recited in the particular enumeration.

DETAILED DESCRIPTION

The present invention provides in particular a method of producing an active material for batteries, said method comprising the following steps a) to d) or consisting of these steps:
a) providing electrochemically active particles,
b) optionally comminuting the electrochemically active particles to an average particle size, as measured using scanning electron microscopy, of less than 2 µm,
c) adding an organic carbon compound, optionally in a suitable organic solvent, and mixing,
d) heating the mixture under protective gas to a temperature above the decomposition limit of the organic compound, preferably a temperature of greater than 300° C., and below the decomposition temperature of the electrochemically active particles, whereby the organic carbon compound decomposes into carbon and this carbon deposits as a homogeneous layer on the surface of the electrochemically active particles.

The electrochemically active particles used in the method of the present invention are $Li_2S$ particles in particular.

The exceedingly low ionic and electronic conductivity of $Li_2S$ requires that the average particle size, as measured using SEM, be less than 2 µm in order that a high specific surface area may be obtained.

When the $Li_2S$ used already has an average particle size of less than 2 µm, grinding is not required (but possible nonetheless).

The carbon compound/source to be added shall be selected such that it decomposes into carbon on heating under protective gas at a temperature below the melting temperature of the electrochemically active particles.

Preference for use as carbon compounds is given in the context of the present invention to sugars, in particular sucrose, or polyacrylonitrile.

Polyacrylonitrile is preferable to sugar in that it can be dissolved in N-methyl-2-pyrrolidone (NMP), leading to a more uniform coating of carbon on the $Li_2S$ particles. This fact is discernible from the improved efficiency during charging and discharging.

However, use of sugar as carbon source will also give outstanding results. These are usually distinctly above the literature results.

The carbon compounds are decomposed to carbon by heating under protective gas, preferably helium, neon, argon or nitrogen, more preferably nitrogen, for 2 to 5 hours, preferably 3 hours, to a temperature of up to 850° C., preferably in the range from 550° C. to 750° C.

This heating to the decomposition temperature can in principle be done at any desired rates of heating—without repercussions for the product, although for practical reasons it is preferable to choose a temperature increase at approximately 2 to 4° C./minute, in particular 3° C./minute.

The heating up to and/or maintaining the temperature may be done in ovens known to a person skilled in the art, preferably in tubular ovens.

The $Li_2S$ particles thus obtained with a carbon layer sheath can then be further processed into electrodes. A corresponding method likewise forms part of the subject matter of the present invention, and comprises steps i) to iv) or consists thereof:
i) providing an active material obtained as per the above-described method of the present invention,
ii) adding at least one electronically conductive additive with or without at least one suitable binder,
iia) optionally adding further added substances,
iii) mixing the materials,
iv) drying the material obtained.

Carbonaceous materials are examples of useful electronically conductive additives.

Useful carbonaceous materials are preferably selected from the group consisting of carbon black, synthetic or natural graphite, graphene, carbon nanoparticles, fullerenes and mixtures thereof.

A useful carbon black is available for example under the name Ketjenblack®.

A preferred carbon black is available for example under the trade name Super P ® or Super P® Li.

Carbonaceous materials can have a mean particle size in the range from 1 nm to 500 µm, preferably 5 nm to 1 µm, more preferably 10 nm to 60 nm.

Useful binders include polyacrylonitrile (PAN), polymethyl methacrylate (PMMA), polyethylene oxide (PEO), cellulose, cellulose derivates, poly(vinylidene difluoride-hexafluoropropylene) copolymer (PVDF-HFP), polytetrafluoroethylene (PTFE), styrene-butadiene rubber (SBR) and polyvinylidene fluoride (PVDF).

Polyvinylidene fluoride (PVDF) is preferred for use as binder in the context of the present invention.

Further added substances may be coated lithium powders for example. These can serve as lithium reservoir to make good an initial irreversible loss of lithium from the actual active material.

Normally, however, the addition of further added substances can be eschewed.

The active materials can be mixed with the at least one electronically conductive additive and the at least one suitable binder in customary ratios.

In one version of the present invention, the weight ratio of active material:additive:binder is 4:5:1.

The cathode material thus obtained can then be processed into an electrode in the manner which is common practice in the art.

For example, it can be applied to aluminum foil, nickel foil or Al/Ni foil, which serve as current collectors.

Nonetheless, further current collectors commonly known in the art can also be used.

As already extensively discussed in the literature, the choice of a suitable electrolyte and also of the appropriate separator also plays a part (cf. Peled et al. J. Electrochem. Soc., 136, No. 6 (1989) 1621-1625; Jin et al. Journal of Power Sources 117 (2003) 148-152; Chang et al. Journal of Power Sources 112 (2002) 452-460).

Any electrolytes known to a person skilled in the art can be used as electrolytes in the context of the present invention, including organic electrolytes comprising lithium-containing conducting salts known to a person skilled in the art and also ionic liquids comprising conducting salts such as, for example, lithium bis(fluorosulfonyl)imide (LiFSI) or lithium bis(trifluoromethanesulfonyl)imide (LiTFSI) in 1-butyl-1-methylpyrollidinium bis(trifluoromethanesulfonyl)imide ($PYR_{14}TFSI$), polymer electrolytes comprising conducting salts such as, for example, polyethylene oxide (PEO) comprising LiTFSI (and optionally $PYR_{14}TFSI$) and also optionally liquid organic electrolytes such as, for example, $LiCF_3SO_3$ in TEGDME, $LiPF_6$ in any desired mixtures of ethylene carbonate (EC)/dimethyl carbonate (DMC)/diethyl carbonate (DEC)/propylene carbonate (PC) and also LiTFSI or $LiPF_6$ or $LiBF_4$ in a mixture of dimethoxyethane (DME) and 1,3-dioxolane (DOL) or ionic liquids, solid-state electrolytes and any desired combinations.

Preference is given to using those selected from the group consisting of lithium bis(fluorosulfonyl)imide and lithium bis(trifluoromethanesulfonyl)imide in 1-butyl-1-methylpyrollidinium bis(trifluoromethanesulfonyl)imide, polyethylene oxide comprising LiTFSI, polyethylene oxide comprising LiTFSI and $PYR_{14}TFSI$, $LiCF_3SO_3$ in TEGDME, $LiPF_6$ in any desired mixtures of ethylene carbonate/dimethyl carbonate/diethyl carbonate/propylene carbonate, LiTFSI in dimethoxyethane/1,3-dioxolane, $LiPF_6$ in dimethoxyethane/1,3-dioxolane, $LiBF_4$ in dimethoxyethane/1,3-dioxolane, $LiCF_3SO_3$, in 3:7 tetraethylene glycol dimethyl ether (TEGDME)/1,3-dioxolane or mixtures thereof.

Particular preference for use as electrolyte is given to $LiCF_3SO_3$, in 3:7 tetraethylene glycol dimethyl ether (TEGDME)/1,3-dioxolane.

Separators which can be used in the context of the present invention are separators selected from the group consisting of polypropylene and/or polypropylene-based separators, fiberglass-based separators, ceramic separators and mixtures/combinations thereof.

Polymer and/or solid-state electrolytes can simultaneously also serve as separator.

Particular preference for use as separator is given to a three-ply membrane separator that is commercially available as Celgard® 2325 for example.

It is an essential aspect of the present invention that the active materials are obtained without using water as a solvent, since $Li_2O$ and $H_2S$ would otherwise be formed. Hence the active material would be "lost".

The present invention further provides for the use of the active material obtained according to the present invention, as cathode material in lithium-metal and/or lithium-ion batteries.

The present invention has some appreciable advantages, some of which will now be set out:

The use of lithium sulfide ($Li_2S$) as active material notwithstanding a theoretically considered lower specific capacity (1166 mAh $g^{-1}$) offers some advantages over elemental sulfur:

Since $Li_2S$ is already lithiated, it can be used not only in lithium-sulfur batteries but also as cathode material in lithium-ion batteries. This enables the use of anode materials other than metallic lithium [e.g., graphite, silicon, tin, etc.] and thus uncouples the material presented herein from the use of metallic lithium on the anode side.

This is an enormous advantage for use in practice, since the use of metallic lithium still carries with it the risk of dendrite formation.

Secondly, it increases the flexibility of possible deployments for the material and permits combined use with all already commercially successful and/or future anode materials from lithium-ion technology.

In addition, the use of $Li_2S$ as starting material anticipates the volume expansion during the lithiation of sulfur, which would lead to cracks in the carbon sheath. This means that the carbon layer surrounding the $Li_2S$ particles remains intact even during repeated charging and discharging processes.

As a result, the specific capacity (and thus the energy density of the cell) obtained in practice is increased, cycling stability is distinctly improved and an almost 100% efficiency is achieved for the charging and discharging cycles.

This altogether makes possible a distinctly higher attainable number of cycles, in particular if the overall system merely has a limited supply of lithium ions available and not, as in the case with use of lithium metal, a large excess of these. This is of utmost importance particularly with a view to using the material as cathode material in lithium-ion batteries using, for example, graphite as anode, since precisely no external lithium source is available in this system.

The homogeneous carbon sheath as such, moreover, has a significant enhancing effect on the electronic conductivity of the active material obtained. This leads to a non-appearing electronic insulation of $Li_2S$ particles and agglomerates thereof, which would thereby become electrochemically inactive and hence would no longer be available for further charging and discharging processes.

In particular, however, the homogeneous carbon sheath is effective in preventing the emigration of the polysulfides dissolved in the electrolyte and their deposition on the cathode surface (together with an electrochemical deactivation of the active material deposited there) and also on the anode surface (together with an increasing passivation of the anode and also, in particular, an onset of the so-called "shuttle mechanism", which is responsible for the self-discharge of sulfur-based battery systems).

The homogeneous carbon sheath, moreover, prevents physical contact between the sulfur and $Li_2S$ particles and works actively to oppose any particle agglomeration in the cycling process.

The present invention prefers to use $Li_2S$ to elemental sulfur for use as starting material for the cathodes.

In the context of the present invention, a kind of "microreactor" constructed for the electrochemically active particles meets the following requirements:
  To stop soluble polysulfides diffusing to the cathode surface and/or to the anode side and become deposited there (passivation and "shuttle mechanism").
  To prevent particle agglomeration during charging and discharging.
  To ensure electronic contact to the current collector.

It was at the same time ensured in the context of the present invention that the "envelope" of this microreactor is permeable to the liquid electrolyte in order to safeguard lithium ion transport to the active material.

The known volume changes due to lithiation and delithiation were also considered.

The "reactor envelope" was made of carbon, since carbon has a high level of electronic conductivity and keeps the long-chain soluble polysulfides in the interior of the "reactor" whilst at the same time being permeable to the electrolyte and also to lithium ions.

The use of $Li_2S$ in place of elemental sulfur as starting material additionally exploits the following advantages:

$Li_2S$ has a distinctly higher melting point than elemental sulfur, and specifically it is about 938° C.

These higher temperatures are required for the method of producing the active material in the manner of the present invention, i.e., for applying a homogeneous layer of carbon—a carbon sheath—to the particles.

The "anticipation" of lithiation also anticipates the attendant volume expansion, so there is no risk of the carbon sheath being damaged by such a volume expansion.

Since $Li_2S$ already contains lithium, it is not absolutely necessary to recur to metallic lithium on the anode side, rather the use of other anode materials is also conceivable.

The method of the present invention is carried out using inexpensive materials (such as, for example, sugars, acetonitrile and polyacrylonitrile), which represents an enormous economic and at least partly ecological advantage.

The method of the present invention is an altogether cost-effective one, since it does not require elaborate configurations of equipment. Practice on a large industrial scale can accordingly be achieved very quickly and simply.

It is not just that merely small amounts of electrolyte are needed in the method of the present invention which is crucial for the costs of a battery, but that use of merely small amounts also surprisingly improves the performance of such a battery with regard to an increased specific capacity, a higher efficiency and also an improved cycling stability.

The method of the present invention, moreover, can be scaled up to a large industrial scale in an easy manner and without major financial or other commitment.

The results achieved on using the active material obtained according to the present invention are superior to most of the results published in the literature.

It should be noted in this connection, for the sake of better comparability, that the values of the specific capacities achieved are always based on the proportion of $Li_2S$ as active material.

Examples of some versions of active materials according to the present invention can be characterized as follows:

Version 1 is an active material for batteries which comprises electrochemically active particles coated/sheathed with a homogeneous envelope.

Version 2 is an active material as per version 1 wherein the electrochemically active particles are $Li_2S$ particles.

Version 3 is an active material as per version 1 or 2 wherein the envelope possesses a high level of electronic conductivity.

Version 4 is an active material as per one or more of the preceding versions wherein the envelope is permeable to liquid electrolytes.

Version 5 is an active material as per one or more of the preceding versions wherein the envelope comprises carbon.

Version 6 is an active material as per one or more of the preceding versions wherein the carbon in the envelope comes from an organic source of carbon.

Version 7 is an active material as per one or more of the preceding versions wherein the carbon in the envelope is generated by thermally decomposing an organic source of carbon.

Version 8 is an active material as per one or more of the preceding versions wherein the carbon in the envelope is generated by thermal decomposition of sucrose or polyacrylonitrile, preferably by thermal decomposition of polyacrylonitrile.

Version 9 is an active material as per one or more of the preceding versions wherein the electrochemically active particles coated/sheathed with an envelope are additized with an electronically conductive additive.

The present invention also encompasses batteries obtained using the active materials of the present invention and/or the active materials obtained via the method of the present invention, and also the corresponding use of the active materials of the present invention and/or of the active materials obtained via the method of the present invention.

The various embodiments of the present invention can be combined with each or one another in any desired manner.

The layer of carbon obtained on the surface of the electrochemically active particles by the specific procedure of the present invention is a homogeneous, uniform and uninterrupted coating. Such was unobtainable via the prior art processes, where an already carbonized substance was mixed with the active material.

The invention will now be elucidated with reference to the following non-limiting figures and examples:

FIGURE DESCRIPTION

FIG. 1 shows three diagrams regarding measurements with three electrodes where $Li_2S$ coated with carbon as per the inventive method by proceeding from sucrose as carbon source was used as active material. Production took place as per Examples 1 and 2.

In each of the three diagrams, the specific capacity (in mAhg/sulfur) and the efficiency (in percent) are plotted against the cycle count.

Diagram 1 shows a measurement with 100 µl of electrolyte and C/50=0.02755 mA, diagram 2 shows a measurement with 45 µl and C/50=0.02635 mA and diagram 3 shows a measurement with 30 µl and C/50=0.02420 mA.

General conditions were each the same for all three measurements:
C-rate: C/50
A C-rate of C/50 concerns in general an applied current density which will dis/charge the electrode at/to full theoretical capacity in 50 hours.
Galvanostatic cycling in a voltage range of 1.2 to 3.5 V
Electrode area: 1.13 cm$^2$
(Galvanostatic cycling of carbon-coated $Li_2S$-based electrodes using sucrose as carbon source and varying amounts of employed electrolyte: Upper illustration 100 µl (C/50☐0.02755 mA), middle illustration 45 µl (C/50☐0.02635 mA) and lower illustration 30 µl (C/50☐0.02420 mA). Applied C-rate: C/50. Cut-off potentials: 1.2 and 3.5 V vs. Li$^+$/Li.)

Figure 2:
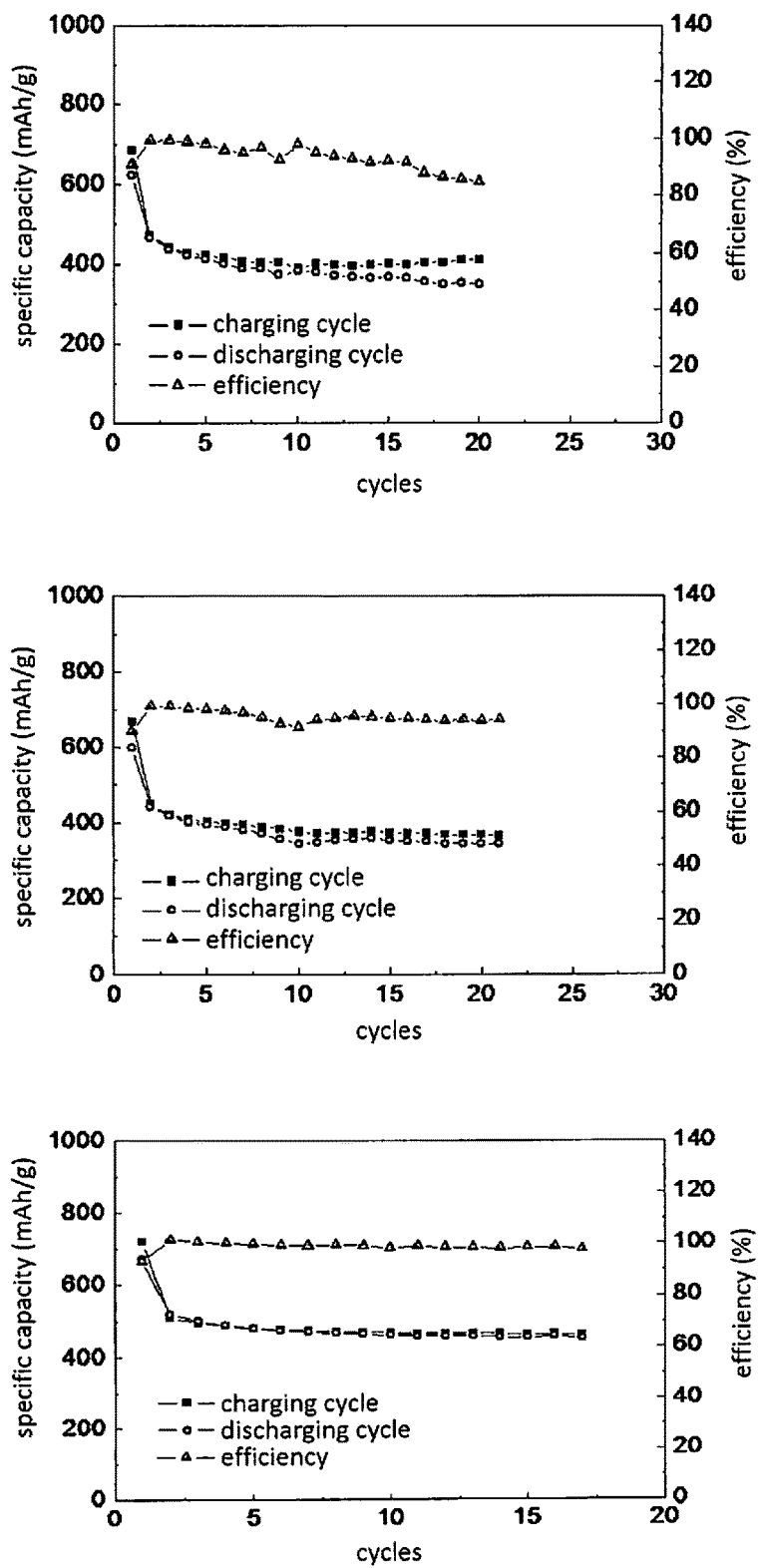

FIG. 2 shows three diagrams regarding measurements with three electrodes where $Li_2S$ coated with carbon as per the inventive method by proceeding from polyacrylonitrile as carbon source was used as active material. Production took place as per Examples 1 and 2.

Diagram 1 shows a measurement with 60 µl of electrolyte and C/50=0.01524 mA, diagram 2 shows a measurement with 45 µl and C/50=0.01617 mA and diagram 3 shows a measurement with 30 µl and C/50=0.01422 mA.

General conditions as with FIG. 1 for all measurements.
(Galvanostatic cycling of carbon-coated $Li_2S$-based electrodes using PAN as carbon source and varying amounts of employed electrolyte: Upper illustration 60 µl (C/50☐0.01524 mA), middle illustration 45 µl (C/50—0.01617 mA) and lower illustration 30 µl (C/50☐0.01422 mA). Applied C-rate: C/50. Cut-off potentials: 1.2 and 3.5 V vs. Li$^+$/Li.)

Figure 3:
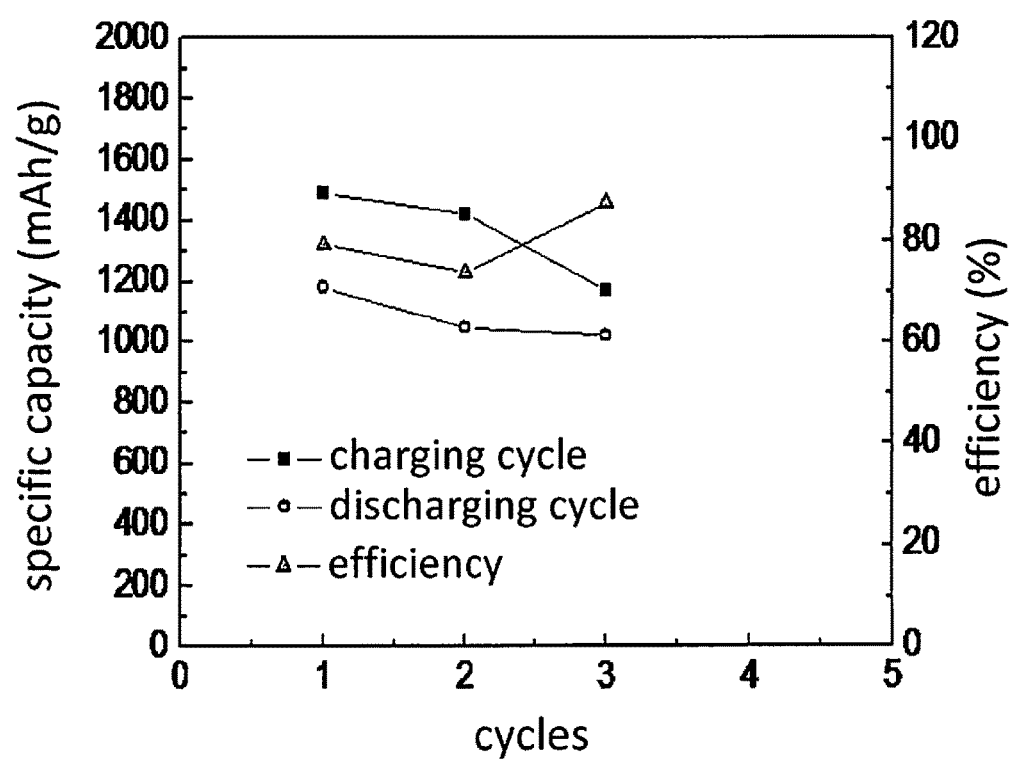

FIG. 3 shows a diagram regarding a measurement of an electrode as per the prior art with sulfur as active material with 30 µl of electrolyte and C/50=0.01358 mA.

General conditions were the same as with FIGS. 1 and 2.
(Galvanostatic cycling of a sulfur-based electrode. Applied C-rate: C/50☐0.01358 mA. Cut-off potentials: 1.2 and 3.5 V vs. Li$^+$/Li.)

Figure 4:
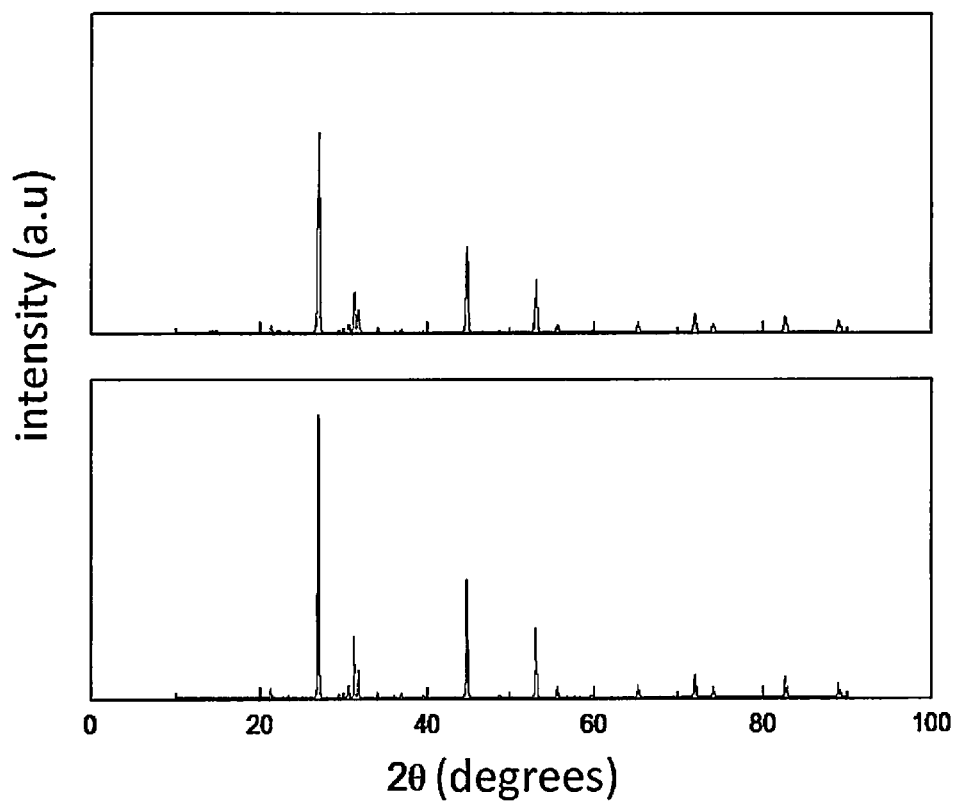

FIG. 4 shows two x-ray diffraction diagrams. The upper diagram shows an x-ray diffraction diagram of the starting material $Li_2S$. The lower diagram shows an x-ray diffraction diagram of $Li_2S$ carbon coated at 550° C. with the inventive method.

It is evident therefrom that the structure of $Li_2S$ survives the carbon coating.

EXAMPLE 1

Producing the Active Material 3 g of $Li_2S$ were ball milled (30 g of $ZrO_2$ media) in the presence of 10 ml of acetonitrile as lubricating assistant to reduce the average particle size.

The milling was done at 200 to 400 revolutions per minute for 20 minutes and then ceased for 10 minutes. This was repeated 30 times.

Thereafter, 9 g of the ball-milled $Li_2S$ were mixed with 1 g of sucrose in a first batch and with 1 g of polyacrylonitrile solution (formed from 1 g of PAN and 9 g of NMP) in a second batch in a mortar for 30 minutes in each case.

The mixtures were subsequently transferred into a tubular oven.

There, the temperature was raised under nitrogen from room temperature to 550° C. at a heating rate of 3° C./minute and this temperature of 550° C. was maintained isothermally for 3 hours under nitrogen.

EXAMPLE 2

Producing the Active Material

The procedure was initially a repeat of Example 1.
Where the procedure began to differ was in the tubular oven where, under nitrogen, the temperature was raised from room temperature to 300° C. at a heating rate of 3° C./minute and this temperature of 300° C. was maintained for 2 hours.

The temperature was subsequently raised to 750° C. at the same heating rate and isothermally maintained for 3 hours under nitrogen.

EXAMPLE 3

Producing an Electrode

A 40 g quantity of each of the active materials obtained in Example 1 was mixed with 50 g of Super P® Li in a mixer (ball mill) at 200 to 400 revolutions per minute for one hour, followed by a pause of 10 minutes. This was repeated three times.

This was followed by mixing in each case 100 g of a 10% PVDF solution at 300 to 600 revolutions per minute for one hour, followed by pausing for 10 minutes. This was repeated twice.

The products obtained were dried in a drying room at room temperature for 24 hours and then for a further 2 hours at 60° C., 2 hours at 80° C. and 2 hours at 100° C.

The dried cathode materials were used to produce electrodes by arranging the constituents in a pouch bag. The constituents used were Al/Ni voltage collectors, 0.5 M LiCF$_3$SO$_3$ in TEGDME/1,3-dioxane in a ratio of 3:7 as electrolyte and Celgard® 2325 separator.

EXAMPLE 3

Producing an Electrode as per Prior Art (Comparator)

Example 2 was repeated except that sulfur was used as active material.

RESULTS

The electrodes obtained as per Example 2 and Example 3 (comparator) were used to carry out measurements whose results are depicted in FIGS. 1 (C-coated Li$_2$S; starting material: sucrose) and 2 (C-coated Li$_2$S; starting material: polyacrylonitrile) and also FIG. 3 (sulfur, uncoated=comparator).

It is clear from the diagrams of FIGS. 1 to 3 that the electrode as per the prior art has an appreciably lower efficiency than the electrodes comprising the active material of the present invention.

It is further evident that the electrodes comprising the active material as per the present invention have improved cycling stability as compared with the electrode as per the prior art.

The invention claimed is:

1. A method of producing an active material for batteries without using water, said method comprising the steps of:
   a) adding an organic carbon compound to electrochemically active particles comprising Li$_2$S, and mixing to form a mixture, and
   b) heating the mixture under protective gas to a temperature above the decomposition limit of the organic carbon compound and below the decomposition temperature of the electrochemically active particles, whereby the organic carbon compound decomposes into carbon, which forms a homogeneous layer on the surface of the electrochemically active particles comprising Li$_2$S, to form the active material.

2. The method as claimed in claim 1, wherein the organic carbon compound comprises at least one member selected from the group consisting of sucrose and polyacrylonitrile.

3. The method as claimed in claim 1, wherein the organic carbon compound comprises polyacrylonitrile, and the mixture further comprises an organic solvent for the organic carbon compound.

4. The method as claimed in claim 1, wherein an organic solvent for the organic carbon compound is present in the mixture.

5. The method as claimed in claim 3, wherein the solvent comprises N-methyl-2-pyrrolidone.

6. The method as claimed in claim 1, wherein the mixture in step b) is heated to a temperature of up to 850° C.

7. The method as claimed in claim 6, wherein the temperature is in the range from 550 to 750° C.

8. The method as claimed in claim 6, wherein the temperature is maintained at said temperature for 2 to 5 hours.

9. A method as in claim 1 further comprising incorporating the active material into an electrode.

10. A method as in claim 1 further comprising incorporating the active material into a battery.

11. A method according to claim 9, wherein said electrode comprises a cathode, and wherein said active material is present in a cathode.

12. A method according to claim 10, wherein the battery is a lithium-metal or lithium-ion battery.

13. A method as in claim 1 further comprising
   i) mixing the active material and at least one electronically conductive additive to form a materials mixture, and
   ii) drying the materials mixture to obtain a cathode material.

14. An active material for batteries produced as in claim 1, the active material comprising electrochemically active particles comprised of Li$_2$S particles coated with a homogeneous carbon envelope, wherein the weight ratio of sulfur in Li$_2$S to carbon in the homogeneous carbon envelope is in the range of about 9.2:1 to about 15:1.

15. An electrode containing the active material for batteries of claim 14, wherein the electrode containing the active material has a specific capacity above about 600 mAh/g sulfur.

16. A method of producing an active material for batteries without using water, the method consisting of the steps of:
   a) adding an organic carbon compound to electrochemically active Li$_2$S particles, and mixing to form a mixture, and
   b) heating the mixture under protective gas to a temperature above the decomposition limit of the organic carbon compound and below the decomposition temperature of the electrochemically active particles, whereby the organic carbon compound decomposes into carbon, which forms a homogeneous layer on the surface of the electrochemically active particles comprising Li$_2$S, to form the active material.

17. A method as in claim 1 comprising, prior to adding the organic compound, comminuting the electrochemically active particles to an average particle size of less than about 2 μm, as measured using scanning electron microscopy.

18. A method as in claim 9 wherein the electrode containing the active material has a specific capacity above about 500 mAh/g sulfur.

19. A method as in claim 13 wherein at least one binder is included in step i).

20. The method as in claim 2 wherein the organic compound consists of sucrose or polyacrylonitrile.

21. The method as in claim 1 wherein the weight ratio of sulfur in Li$_2$S to carbon in the organic compound is in the range of about 9.2:1 to about 15:1.

22. The method as in claim 1 wherein the active material has a weight ratio of sulfur in Li$_2$S to carbon in the homogeneous carbon envelope in the range of about 9.2:1 to about 15:1.

* * * * *